(12) United States Patent
Berglund et al.

(10) Patent No.: US 8,295,670 B2
(45) Date of Patent: Oct. 23, 2012

(54) LOW PROFILE FIBER DROP POINT OF ENTRY SYSTEM

(75) Inventors: Sidney J. Berglund, Round Rock, TX (US); Zachary M. Thompson, Austin, TX (US); Victor J. Borer, Austin, TX (US); Linnea M. Wilkes, Cedar Park, TX (US); Kurt H. Petersen, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 288 days.

(21) Appl. No.: 12/731,724

(22) Filed: Mar. 25, 2010

(65) Prior Publication Data

US 2010/0247052 A1    Sep. 30, 2010

Related U.S. Application Data

(60) Provisional application No. 61/164,176, filed on Mar. 27, 2009.

(51) Int. Cl.
  *G02B 6/00* (2006.01)
(52) U.S. Cl. ........ 385/138; 385/134; 385/136; 385/137; 385/139
(58) Field of Classification Search .................. 385/134, 385/136, 137, 138, 139
See application file for complete search history.

(56) References Cited

U.S. PATENT DOCUMENTS

| | | |
|---|---|---|
| 3,133,753 A | 5/1964 | Goodman et al. |
| 3,654,379 A | 4/1972 | Rodgers |
| 4,459,165 A | 7/1984 | Meis et al. |
| 4,618,741 A | 10/1986 | Bramwell |
| 4,804,020 A | 2/1989 | Bartholomew |
| 4,911,525 A | 3/1990 | Hicks et al. |
| 5,678,609 A | 10/1997 | Washburn |

(Continued)

FOREIGN PATENT DOCUMENTS

DE    198 43 263 A1    4/2000
(Continued)

OTHER PUBLICATIONS

Publication: "Flat Cable System is Introduced," 3M Megaphone Newspaper, Dec. 1962; 1 page.

(Continued)

*Primary Examiner* — Jennifer Doan
(74) *Attorney, Agent, or Firm* — Gregg H. Rosenblatt

(57) ABSTRACT

A low profile telecommunications fiber drop point of entry system for an interior room of an MDU, school, hotel, hospital, MTU or other commercial or residential location. The system includes a duct having one or more optical fiber communications lines and mountable to a first wall. The system further includes an access and storage structure at least partially disposable behind the first wall. The structure includes a first base unit having a first wall mounting portion and a first low profile cover, the cover being mountable over at least a portion of the duct. The first wall mounting portion includes a main port to fit over a hole formed in the first wall, the structure having a fiber slack storage area disposed between the first wall mounting portion and the first cover. The structure further includes an extension arm mounted to the first wall mounting portion and extending behind the first wall, the extension arm supporting a carrier configured to hold an optical fiber connector coupling device. A first optical fiber from the duct is terminated in a first optical fiber connector that is mounted on the connector coupling device.

18 Claims, 8 Drawing Sheets

U.S. PATENT DOCUMENTS

| | | | |
|---|---|---|---|
| 5,692,545 A | 12/1997 | Rodrigue | |
| 5,721,394 A | 2/1998 | Mulks | |
| 5,804,765 A | 9/1998 | Siemon et al. | |
| 6,504,098 B2 | 1/2003 | Seamans | |
| 6,911,597 B2 | 6/2005 | Seamans et al. | |
| 7,341,403 B2 | 3/2008 | Tsuchiya et al. | |
| 7,369,738 B2 | 5/2008 | Larson et al. | |
| 7,397,993 B1 | 7/2008 | Navé et al. | |
| 7,406,241 B1 | 7/2008 | Opaluch et al. | |
| 7,668,432 B2 | 2/2010 | Mullaney | |
| 7,869,681 B2 * | 1/2011 | Battey et al. | 385/135 |
| 2002/0181905 A1 | 12/2002 | Yoshida et al. | |
| 2003/0049008 A1 | 3/2003 | Zeidan | |
| 2005/0184524 A1 * | 8/2005 | Stravitz | 285/903 |
| 2005/0213920 A1 | 9/2005 | Tanaka et al. | |
| 2008/0069513 A1 | 3/2008 | Desanti | |
| 2008/0159740 A1 | 7/2008 | Bell et al. | |
| 2008/0187276 A1 | 8/2008 | Roberts et al. | |
| 2008/0226236 A1 | 9/2008 | Pepin et al. | |
| 2009/0003782 A1 | 1/2009 | Bell et al. | |
| 2009/0060445 A1 | 3/2009 | Mullaney et al. | |
| 2009/0211171 A1 | 8/2009 | Summers | |
| 2009/0294016 A1 | 12/2009 | Sayres et al. | |
| 2009/0324188 A1 | 12/2009 | Berglund et al. | |
| 2010/0109174 A1 | 5/2010 | Abernathy et al. | |

FOREIGN PATENT DOCUMENTS

| | | |
|---|---|---|
| EP | 0 490 609 A | 6/1992 |
| EP | 0 992 826 A2 | 4/2000 |
| EP | 1 447 893 A1 | 8/2004 |
| FR | 2 688 897 B1 | 9/1993 |
| FR | 2 916 284 A1 | 11/2008 |
| GB | 2 377 089 A | 12/2002 |
| JP | 59 031902 A | 2/1984 |
| JP | 4016262 B2 | 12/2007 |
| JP | 2008-309894 A | 12/2008 |
| KR | 20-0399079 Y1 | 10/2005 |
| WO | WO 03/046622 A1 | 6/2003 |
| WO | WO 2005/096054 A1 | 10/2005 |
| WO | WO 2008/124293 | 10/2008 |
| WO | WO 2009/018421 A1 | 2/2009 |
| WO | WO 2010/068585 A1 | 6/2010 |

OTHER PUBLICATIONS

Publication: "New Flat Cable is Available," 3M Megaphone Newspaper, Jun. 1964; 1 page.

Publication: "3M Cable Unsnarls Wiring Woes with the Neat System," The Tartan Magazine, 3rd Quarter 1965; 3 pages.

Form PCT/ISA/210, dated Jun. 17, 2010, issued in PCT/US2009/068437.

U.S. Appl. No. 61/164,184, filed Mar. 27, 2009, entitled "Ducts to Support a Drop Access Location System for Horizontal Cabling in Multi-Dwelling Unit Applications".

* cited by examiner

LOW PROFILE FIBER DROP POINT OF ENTRY SYSTEM

CROSS REFERENCE TO RELATED APPLICATION

This application claims the benefit of U.S. Provisional Patent Application No. 61/164,176, filed Mar. 27, 2009, the disclosure of which is incorporated by reference herein in its entirety.

BACKGROUND OF THE INVENTION

1. Field of the Invention

The present invention is directed to a low profile fiber drop point of entry system and method of installing the same.

2. Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining building access, limited distribution space in riser closets, and space for cable routing and management. Specifically, FTTX deployments within existing structures make it difficult to route cables within the walls or floors, or above the ceiling from a central closet or stairwell, to each living unit.

Conventionally, a service provider installs an enclosure (also known as a fiber distribution terminal (FDT)) on each floor, or every few floors, of an MDU. The FDT connects the building riser cable to the horizontal drop cables which run to each living unit on a floor. Drop cables are spliced or otherwise connected to the riser cable in the FDT only as service is requested from a tenant in a living unit. These service installations require multiple reentries to the enclosure, putting at risk the security and disruption of service to other tenants on the floor. This process also increases the service provider's capital and operating costs, as this type of connection requires the use of an expensive fusion splice machine and highly skilled labor. Routing and splicing individual drop cables can take an excessive amount of time, delaying the number of subscribers a technician can activate in one day, reducing revenues for the service provider. Alternatively, service providers install home run cabling the full extended length from each living unit in an MDU directly to a fiber distribution hub (FDH) in the building vault, therefore encompassing both the horizontal and riser with a single extended drop cable. This approach creates several challenges, including the necessity of first installing a pathway to manage, protect and hide each of the multiple drop cables. This pathway often includes very large (e.g., 2 inch, 4 inch to 6 inch) pre-fabricated square or crown molding made of plastic, composite, or wood. Many of these pathways, over time, become congested and disorganized, increasing the risk of service disruption due to fiber bends and excessive re-entry.

SUMMARY

According to an exemplary aspect of the present invention, a low profile telecommunications fiber drop point of entry system is provided. The system includes a duct having one or more optical fiber communications lines and surface mountable to a first wall. The system further includes an access and storage structure at least partially disposable behind the first wall. The structure includes a first base unit having a first wall mounting portion and a first low profile cover, the cover being mountable over at least a portion of the duct. The first wall mounting portion includes a main port to fit over a hole formed in the first wall, the structure having a fiber slack storage area disposed between the first wall mounting portion and the first cover. The structure further includes an extension arm mounted to the first wall mounting portion and extending behind the first wall, the extension arm supporting a carrier configured to hold an optical fiber connector coupling device. A first optical fiber from the duct is terminated in a first optical fiber connector that is mounted on the connector coupling device.

According to another aspect, a method for providing communications lines to the hallway of an existing MDU is provided. The method includes installing a duct onto a first wall of the hallway of the MDU, wherein the duct includes one of a plurality of loosely packed buffered optical fibers and a ribbon fiber cable disposed in a conduit portion of the duct. At least one optical fiber from the duct is accessed at a first point of entry to a residence unit. At the first point of entry, a first access and storage structure is installed at least partially disposable behind the first wall, the structure including a first base unit having a first wall mounting portion and a first low profile cover, the cover being mountable over at least a portion of the duct. The first wall mounting portion includes a main port having a funnel-type shape to fit over a hole formed in the first wall, the structure having a fiber slack storage area disposed between the first wall mounting portion and the first cover. The structure further includes an extension arm mounted to the first wall mounting portion and extending behind the first wall, the extension arm supporting a carrier configured to hold an optical fiber connector coupling device. The accessed fiber is terminated into a first optical fiber connector. The terminated accessed fiber is coupled to the connector coupling device. Excess fiber from the accessed fiber is stored through the slack storage area of the first base unit. In yet a further aspect, an individual living unit (or other interior room) of the MDU is accessed at the first point of entry from the hallway, wherein a through hole is drilled in a second wall disposed in the individual living unit. A second base unit is installed in the individual living unit, wherein the second base unit is coupled to the first base unit via the extension arm having its second end fastened to the second base unit. A drop cable originating in the living unit is terminated to a second optical fiber connector, which is then connected to the connector coupling device, wherein the coupling carrier is stored in the interior wall space between the hallway and the living unit.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
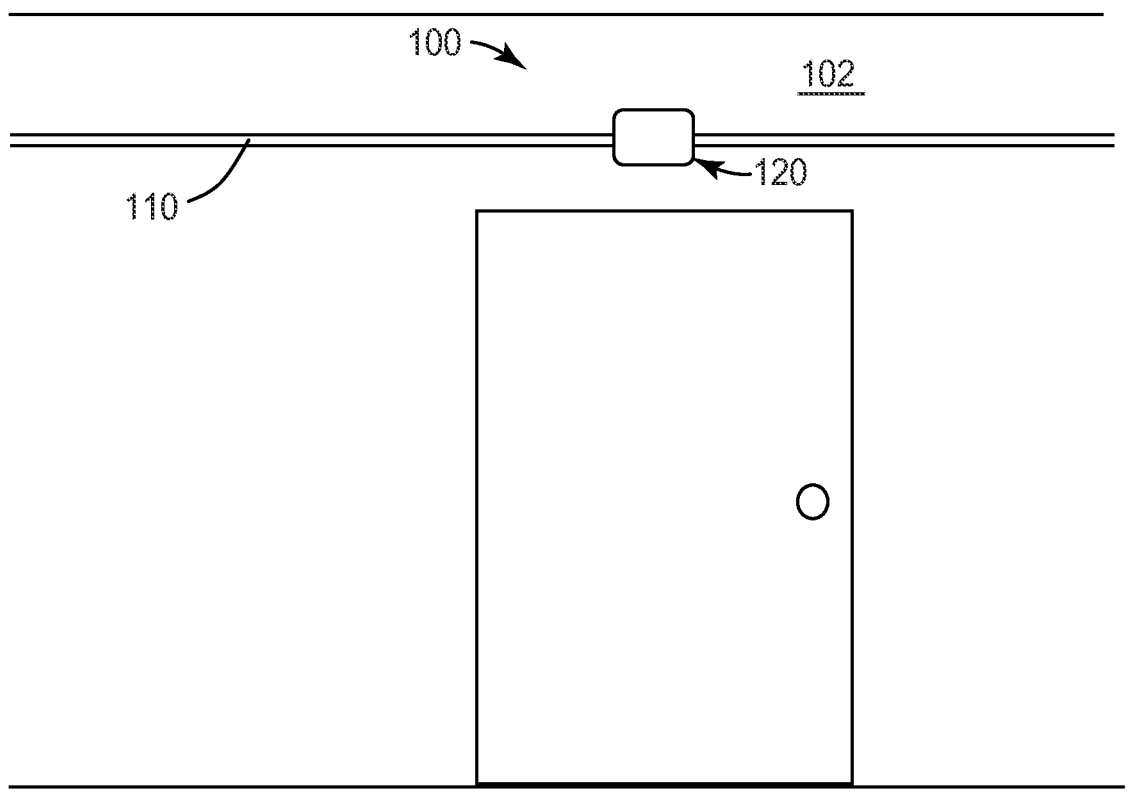
FIG. 1 is a schematic view of a low profile fiber drop point of entry system according to an aspect of the present invention.
Figure 2A:
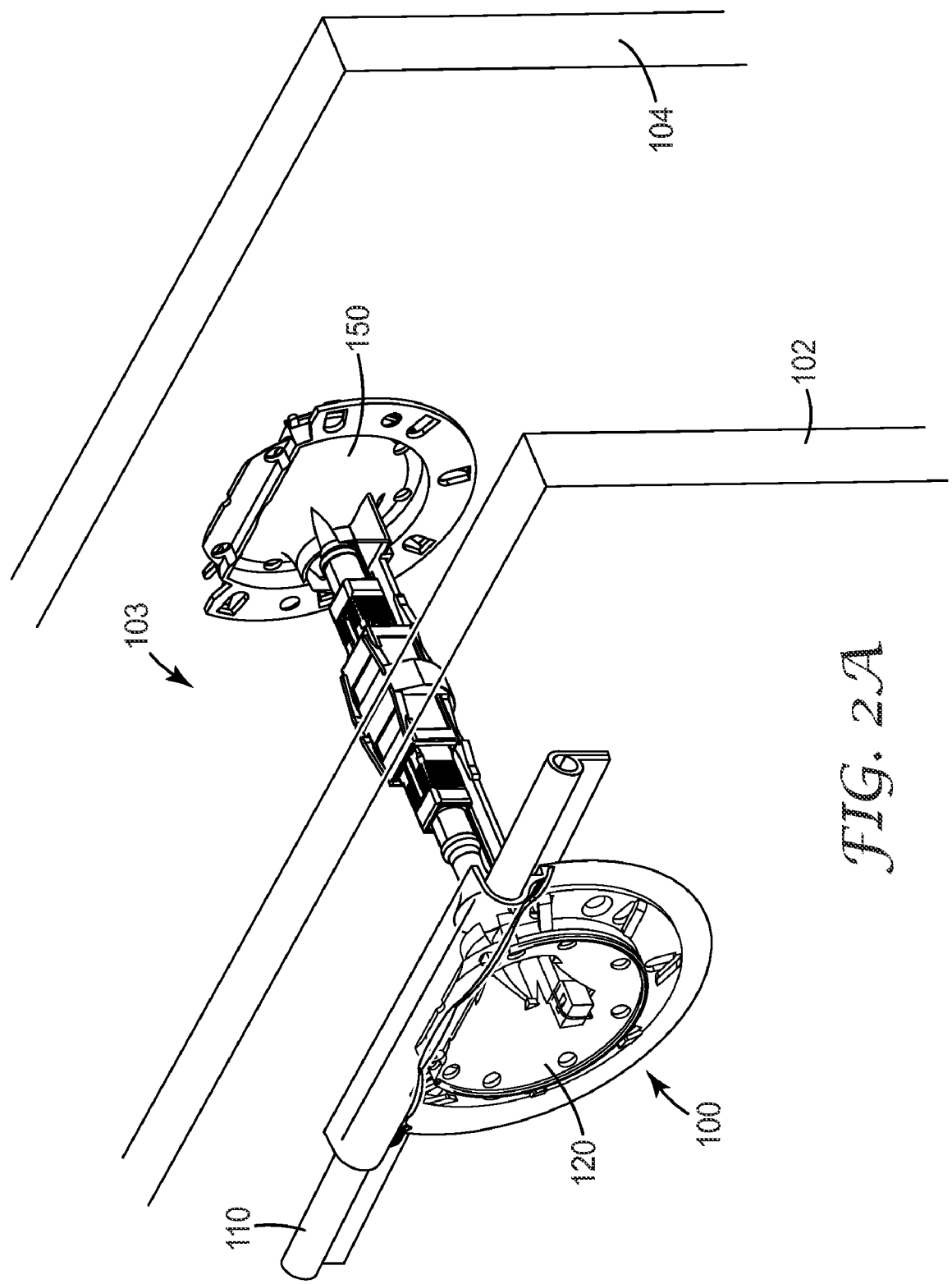
FIGS. 2A and 2B are isometric views and FIG. 2C is a top view of a low profile fiber drop point of entry system according to another aspect of the present invention.
Figure 2B:
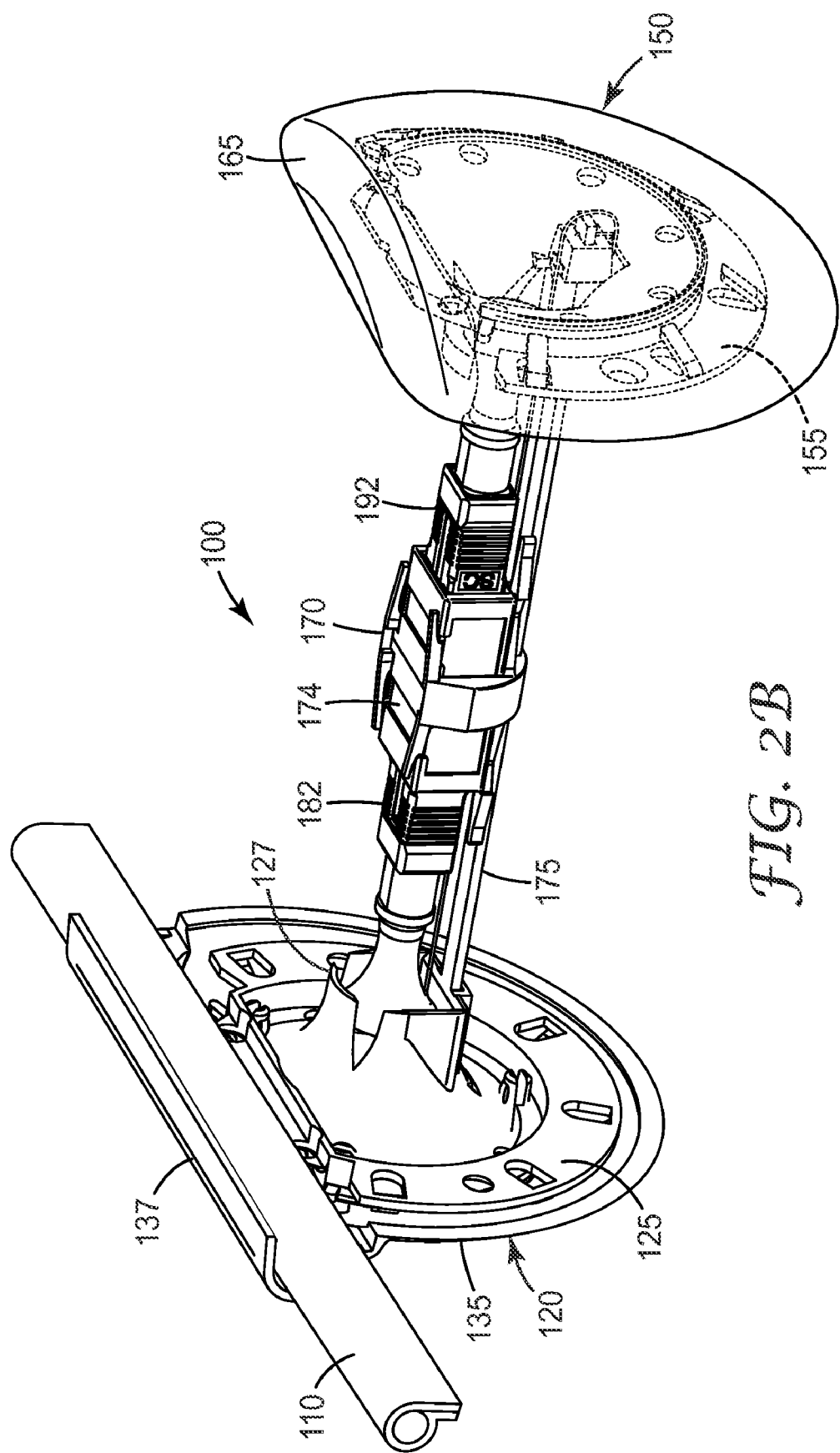
Figure 2C:
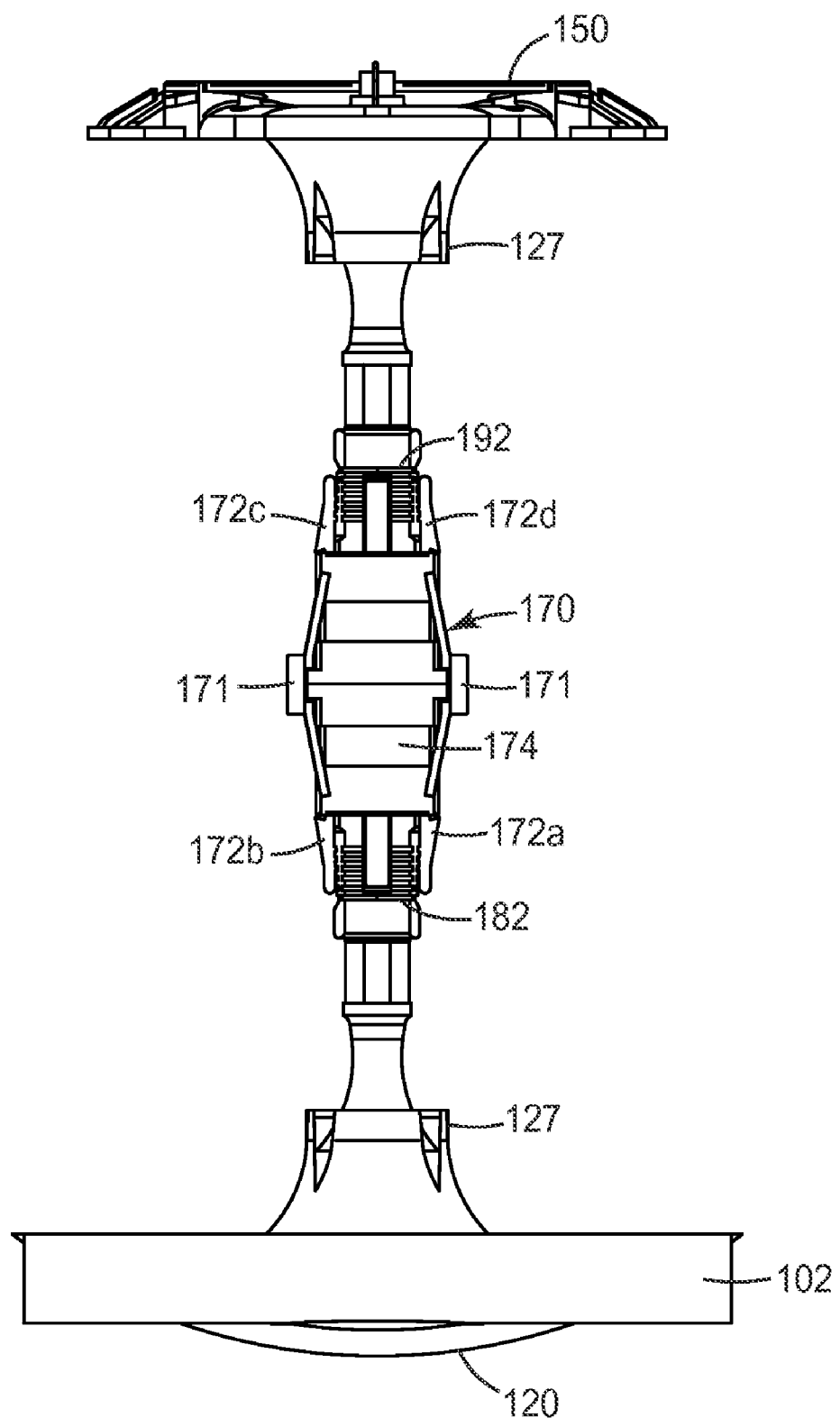

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a low profile fiber drop point of entry system and installation method for use in horizontal cabling applications at an MDU (which for purposes of this application, can include a typical MDU, multiple tenant unit (MTU), hotel, school, hospital or other location). The system 100 provides a pathway for telecommunications lines and access points for dropping individual communication lines to individual living units, such as residences, interior rooms or offices, within the MDU. The components of the system are designed with very low impact profiles for better aesthetics, as the system utilizes existing space between the walls (also referred to herein as interior wall space) for positioning of the connector couplings.

FIG. 1 shows a schematic view of a first aspect of the present invention, a low profile fiber drop point of entry system 100. FIGS. 2A-2C and 3 show system 100 in more detail. The system 100 comprises a duct 110 that contains one or more communications lines and is configured to mount to a generally flat surface. The system 100 also includes an access and storage structure including base units 120, 150. The first base unit 120 includes a wall mounting portion 125 and a cover 135. The second base unit 150 includes a wall mounting portion 155 and a cover 165.

The first base unit 120 is designed to mount to a first wall 102, such as a wall in hallway or corridor. The second base unit 150 is designed to mount to a second wall 104, such as a wall inside a living unit, classroom, office, or other residence. An interior wall space 103 is formed between walls 102, 104.

In an exemplary aspect, at least one of the covers (in this example, cover 135) is configured to mount onto and fit over duct 110. In this example, cover 135 includes a mounting channel 137 configured to fit over the duct 110. As such, the configuration of the cover 135 allows for the base unit 120 to be mounted onto duct 110 at nearly any location along the duct path. In addition, this system configuration allows for multiple possible point of entry locations, including above door locations or at lower height locations in the hallway of the MDU. In addition, cover 165 can include one or more fiber entry ports to receive a drop cable from inside the living unit, classroom, office, or other residence (see e.g., FIG. 7C).

The base units 120, 150 support a carrier 170 within interior wall space 103. In an exemplary aspect, the carrier 170 is supported in the interior wall space 103 by an extension arm 175 that is coupled to at least one of (preferably both of) the base units 120, 150. The extension arm 175 can be coupled to the carrier 170 via an opening or eyelet 173 or similar structure.

Figure 4:
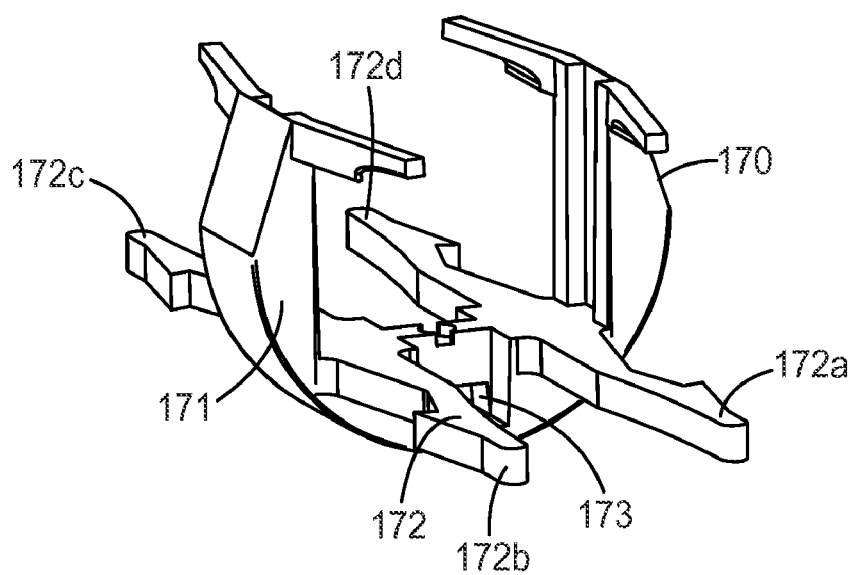
FIG. 4 is an isometric view of a carrier component of a low profile fiber drop point of entry system according to another aspect of the present invention.

The carrier 170 is configured to hold a connector coupling 174 that receives two standard optical fiber connectors 182, 192 which connect the telecommunication line from the duct to a drop cable originating from the customer's living unit or office. In an exemplary aspect, as is shown in FIG. 4, carrier 170 can include a side frame 171 and a bottom support 172 configured to receive and support a standard connector coupling, such as coupling 174 shown in FIG. 2B. In a preferred aspect, the bottom support 172 can be configured to include extending leg members 172a-172d that can engage with a rear portion 127 of the base unit 120, 150, especially during connector mounting, as explained in further detail below.

The wall mounting portions 125, 155 can be secured to a wall or other surface via a conventional securing mechanism. In this example, mounting screws or bolts (not shown) can engage perimeter mounting holes 131. Alternatively, an adhesive can be utilized to attach the wall mounting portion to the wall or other surface.

Figure 3:
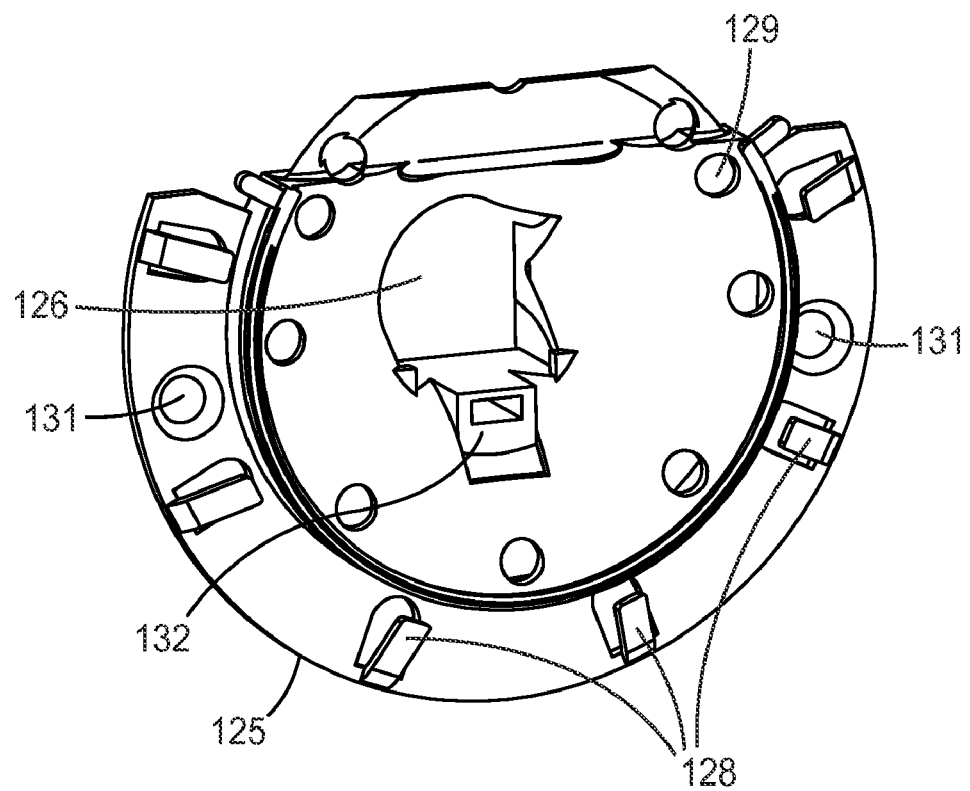
FIG. 3 is an isometric view of a base unit of a low profile fiber drop point of entry system according to another aspect of the present invention.

Each of the wall mounting portions 125, 155, further provides a slack storage section formed along a perimeter portion of an outer facing surface thereof. This slack storage provides for storing excess amounts of a telecommunications line accessed at the base unit. For example, FIG. 3 shows a close up of wall mounting portion 125, which includes a series of tabs or other structures 128 disposed near or at a perimeter of the wall mounting portion that are configured to loosely secure excess fiber around the perimeter of the wall mounting portion. The fiber is protected from over-bending by configuring the wall mounting portion to have a suitable radius or width. Wall mounting portion 155 can have the same structure as wall mounting portion 125.

The cover 135, 165 provides an enclosure for the slack storage section. The cover 135, 165 can be placed onto the wall mounting portion 125, 155 via one or more posts formed on an interior inside surface of the cover via mounting holes 129 formed on the wall mounting portion 125, 155 (see e.g., FIG. 7C).

The interior wall space (e.g., space 103) is accessed via a main port 126 formed in the wall mounting portion 125. As shown in FIG. 3, in an exemplary aspect, the main port is formed generally near the center of the wall mounting portion and can have a funnel-type shape. As described in more detail below, during installation, a hole is drilled into the hallway/residence wall at the access point of entry. The main port 126 is configured to fit over/into the drilled hole. As is also described below (see e.g., FIG. 6), the port may further include an extension structure, such as a tube, which extends into the interior wall space 103 and provides support and protection within the interior space for the carrier and mounted connectors and/or coupling. The wall mounting portion 125 can further include a support structure 132 to engage and secure the extension arm 175. In an exemplary aspect, extension arm 175 comprises a moderately flexible plastic material, such as a conventional cable tie or the like.

In this example, system 100 is installed in a hallway of an exemplary MDU. System 100 can also be utilized in other indoor and outdoor applications, and in commercial or residential buildings, such as in office buildings, professional suites, and apartment buildings. The duct 110 contains one or more communications lines (such as horizontal cables or lines, not shown in FIG. 1) from a telecommunications closet (or other distribution location, not shown) to one or more living units. The communications lines can comprise optical fibers, electrical wires, coaxial/micro-coaxial cable, or a combination of these, for data, video, and/or telephone signal transmission. In one aspect, the communications lines can comprise discrete (loose) or ribbonized fiber, such as 900 µm buffered fiber(s) or other standard size communications fiber. In addition, although the exemplary aspects described herein are often specific to accessing optical fiber lines, it would be understood by one of ordinary skill in the art given the present description that the drop access location system can be configured to accommodate electrical wire drops and hybrid combination drops as well.

The base units 120, 150 can be formed from a rigid plastic material or metal and can have a very low profile and/or decorative outer design (such as a wall sconce, shell, leaf, or streamlined industrial design). The cover 135, 165 can be color-matched to the general area of the installation, so that the base unit does not detract from the aesthetic appeal of the location where it is installed. Further, the cover 135, 165 may further include a decorative overlay film laminated to the outer surface(s). Such a film can comprise a 3M™ Di Noc self-adhesive laminate (available from 3M Company) and can resemble wood grain or metallic surfaces of the surrounding architecture.

The cover 135, 165 provides some protection for the contents of the fiber drop point of entry system when installed. The cover 135, 165 can be removably mounted onto the wall mounting portion of the base unit via a snug fit. The cover can include an overlapping portion (i.e., overlapping the perimeter of the wall mounting portion) to reduce the risk of the intrusion of dirt, dust, water, or other elements. While the base units/covers of the exemplary aspects comprise a generally flattened circular shape, the base units can comprise other shapes as well, such as an oval shape or a rectangle/square with rounded corners, beveled edges, ribbed and/or slotted sides. Also, the base unit can have a square/flattened square shape to resemble a small electrical junction box, switch, face plate, or lighting fixture, such as a wall sconce. In a preferred aspect, the base units/covers have very low profiles, for example, having a depth of from about 0.10 inches to about 0.5 inches, preferably about 0.25 inches, with a main length/diameter of from about 1.5 inches to about 4 inches. If decorative features are attached to the cover, the volume occupied by the access box with the decorative feature can be much greater.

Figure 5:
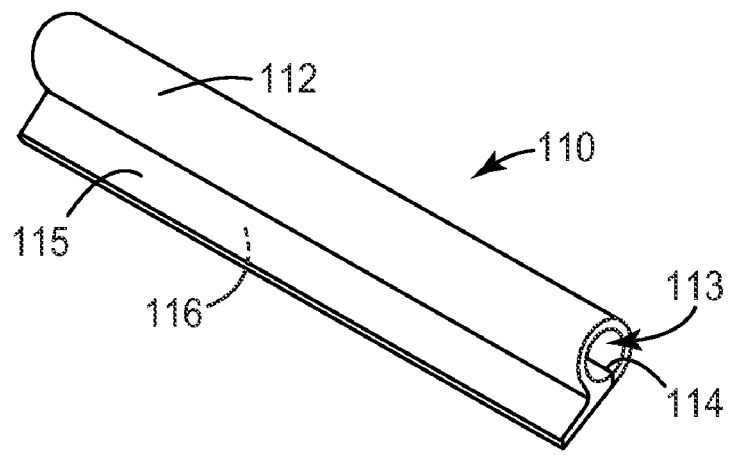
FIG. 5 is an isometric view of an exemplary duct that can be utilized with the low profile fiber drop point of entry system according to another aspect of the present invention.

In more detail, a close-up isometric view of exemplary duct 110 is shown in FIG. 5. Note that while the exemplary embodiment described herein features the duct design of FIG. 5, the low profile fiber drop point of entry system can be implemented with other duct designs as would be apparent to one of ordinary skill in the art given the present description. For example, alternative duct designs, such as a low-profile, adhesive-backed ribbon fiber tape, are provided in US Patent Publication No. 2009/0324188, incorporated by reference in its entirety. Other alternative duct designs are described in a U.S. Patent Application No. 61/164,184, incorporated by reference in its entirety.

In this example, duct 110 includes a conduit portion 112 having a bore 113 provided therethrough. The bore is sized to accommodate one or more communications lines disposed therein. In a preferred aspect, in use, the duct 110 comprises a plurality of communications lines, such as a 900 µm buffer coated fibers. In use, the duct 110 can be pre-populated with one or more communications lines. In addition, duct 110 may also be populated with at least one electrical power line.

While conduit portion 112 can have a generally circular cross-section, in alternative embodiments it may have another shape, such as a rectangle, square, triangle, oval, or other polygonal shaped cross-section.

In one aspect, duct 110 is a structure formed from a polymeric material such as polyvinyl chloride (PVC), making it flexible, flame retardant and robust. As such, duct 110 can be guided and bent around corners and other structures without cracking or splitting. Duct 110 can be continuously formed using a conventional extrusion process.

In addition, duct 110 can further include a slit 114 that runs the longitudinal length of the duct. Slit 114 can provide access for inserting or removing the fiber. In the embodiment of FIG. 5, slit 114 is positioned at the base of the generally circular conduit portion 112. However, in alternative embodiments the slit may be positioned at a different position (e.g., top or middle) on the conduit portion 112. In an alternative aspect, the slit can be within overlapping wall surfaces of the conduit to ensure the communications lines are properly restrained within the conduit portion. This structure can further promote a more aesthetically pleasing duct. This alternative slit can be opened by the installer to access the communications lines within the conduit portion. In a further alternative, duct 110 can include multiple longitudinal slits for access or separation of services (e.g., for use with a divided conduit). In a further alternative, the slit can be sealed (using a conventional heat or laser welding technique, or an over-jacketed extrusion process) during the manufacturing process after population of the conduit portion with communications lines. Accordingly, the duct 110 can be provided to the installer without a slit.

Duct 110 also includes a flange 115 or similar flattened portion to provide support for the duct 110 as it is installed on or fastened to a wall or other generally flat surface, such as a wall, floor, ceiling, or molding. The flange extends along the longitudinal axis of the duct as shown in FIG. 5. While the exemplary duct includes a single flange 115 positioned (in use) below the conduit portion, in an alternative aspects, the flange can be centrally located adjacent the conduit portion. In a further alternative, duct 110 can include a second flange portion for added surface area support. Moreover, the flange 115 can be formed as a sawtooth shape (not shown) to permit in-plane bends along walls or other flat surfaces. In alternative applications, a portion of the flange can be removed for in-plane and out-of-plane bending.

In a preferred aspect, the flange 115 includes a rear surface 116 that has a generally flat surface shape. This flat surface provides a suitable surface area for adhering the duct 110 to a mounting surface, a wall or other surface (e.g., a dry wall, concrete, or other conventional building material) using an adhesive, such as an epoxy, transfer adhesive or double-sided tape. In one alternative aspect, flange surface 116 comprises an adhesive-lined surface with a removable liner. In use, the liner can be removed and the adhesive-backed surface can be applied to a mounting surface, such as a smooth or textured surface. In alternative aspects, other fastening techniques (e.g., nails, staples, mounting brackets, etc.) can be utilized. Also, as the exemplary duct 110 is flexible, it can be adhered to modestly curved surfaces as well.

In this exemplary configuration, one or more communications lines disposed within duct 110 can be accessed and connected to one or more drop wires or drop fibers to service a particular living unit. For example, a first fiber from duct 110 can be coupled to drop fiber cable from a particular living unit. In an alternative aspect, more than one fiber from the duct can be accessed at this location. The communication fiber(s) can be accessed either through a separate window cut made to the conduit portion 112 of the duct or through the slit 114 already formed in duct 110, depending on the particular configuration of the duct.

As mentioned above, the fiber drop point of entry system can accommodate a coupling device that is supported by the suspended carrier. The coupling device 174 may comprise an optical splice, a coupling or an adapter for connecting standard optical connectors. For example, a standard SC fiber connector coupling, available from most commercial connector suppliers such as 3M Company or Alliance Fiber Optic Products, can be utilized. In addition, the coupling device may include a movable shutter (not shown) at each entrance to keep out dust and dirt when not populated with a connector.

As is also mentioned above, each base unit 120, 150 can accommodate slack storage. In one example, up to 5 feet (or more) of 900 μm buffered fiber and up to 1 foot (or more) of 2.9 mm fiber slack can be stored within base unit 120, 150 (depending on the diameter of the base unit).

In one aspect, the communication fiber can comprise a tight bend radius, 900 μm buffered optical fiber. Such an optical fiber cable is commercially available as BendBright XS™ Single Mode Optical Fiber, from Draka Communications. Also in this aspect, the drop fiber cable can comprise a 2.9 mm jacketed drop cable commercially available as ez Patch cabling and ez Drop cabling from Draka Communications.

In a preferred aspect, the communication fiber is field terminated with an optical fiber connector 182. For example, connector 182 can comprise an optical fiber connector that includes a pre-polished fiber stub disposed in ferrule that is spliced to a field fiber with a mechanical splice, such as described in U.S. Pat. No. 7,369,738. Another exemplary field terminated connector is described in US Publication No. 2008/0226236. The communications fiber can be coupled to a drop cable having a connector 192, such as a conventional SC connector, via coupling or adapter 174. Other conventional connectors can be utilized for connectors 182 and 192, as would be apparent to one of ordinary skill in the art given the present description.

The drop cable can be a conventional fiber cable such as a 2.9 mm jacketed fiber cable (e.g., an ez Drop Cable, available from Draka Communications) or blown fiber cabling (containing multiple discrete buffered fibers). The drop cable can be run in either direction (i.e., to or from the access box base unit 120), and can (or not) be pre-connectorized at one or two ends (e.g., a pre-connectorized pigtail of 3 mm jacket cable).

The drop cable extends into an individual living unit through a main port formed in second base unit 150, which is mounted into a hole bored or drilled in the wall of the individual living unit.

The drop fiber cable can be terminated on the other end at an optical network terminal (ONT), such as a single family unit optical network terminal (SFU ONT) or wall box (e.g., a 7342 Indoor Optical Terminal, available from Alcatel-Lucent).

In addition to the coupling, routing and splicing components described above, the point of entry system 100 can be configured to hold other types of components and/or equipment, such as a fusion or mechanical splice, optical splitter, security camera, alarm, fire detection/protection equipment, entrance key, a door bell, RFID card reader, and/or a battery or batteries.

Figure 6:
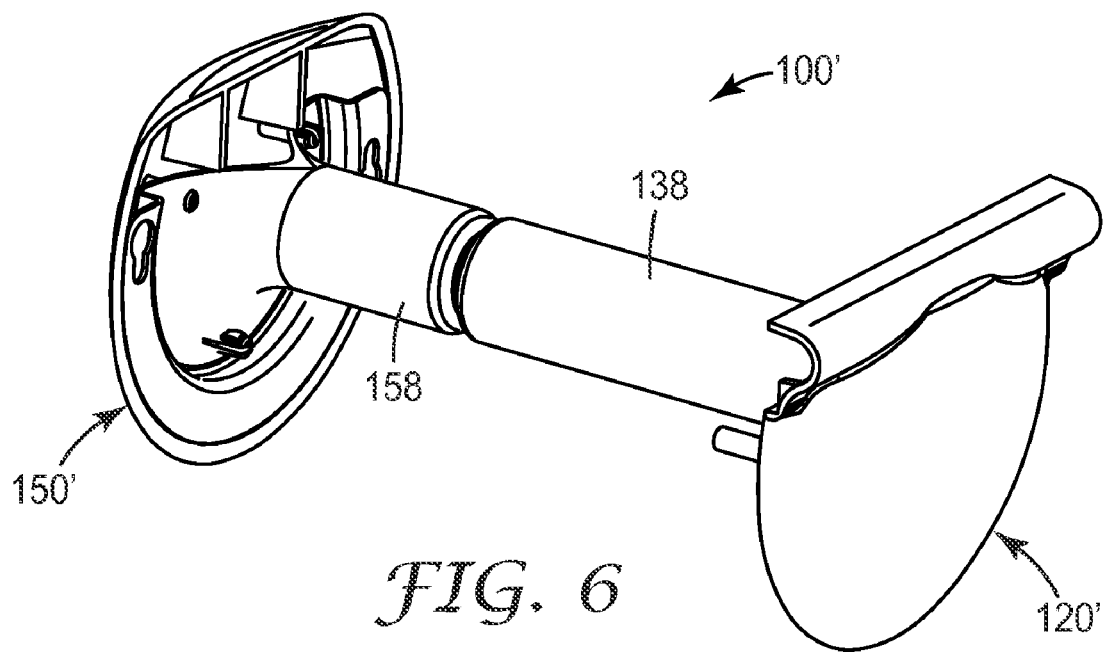
FIG. 6 is an isometric view of a low profile fiber drop point of entry system according to another aspect of the present invention.

In another aspect, an alternative system 100' is shown in FIG. 6, where each of the ports of the respective base units 120', 150' can further include a tubular extension 138 or 158. The tubular extension may be formed from a metal or plastic material and may be a rigid or collapsible structure. The tubular extensions provide further support and protection for the components residing in the interior wall space 103, including the carrier, coupling, connectors and support arm shown in FIG. 2B. In this alternative aspect, the extension arm and/or carrier may be omitted.

In another aspect, a fiber drop point of entry system 100, 100' configured to accommodate horizontal cabling can be installed in the hallway or passageway of an MDU in the following manner. Although the exemplary installation is specific to the aspects described herein, it would be understood by one of ordinary skill in the art given the present description that variations and other installation steps can be implemented. Further, although the description below relates to a single line being coupled for service at a single point of entry, note that more than one service fiber may be accessed at a particular location.

In this example, the duct that is utilized is shaped similar to duct 110 described above. This exemplary duct can be extruded at the factory and the back surface of the flange can be fitted with an adhesive tape (e.g., a double-sided tape) or transfer adhesive with a removable liner. In addition, prior to being fitted with an adhesive tape in some aspects, the duct can be pre-populated with a plurality of loosely packed 900 μm buffered fibers disposed in the conduit portion. The duct can be housed on a spool for delivery and storage prior to mounting.

The duct is mounted to a wall of an MDU hallway by removing the adhesive liner and placing and pressing the duct to the wall at a pre-selected height above the doorways of the living units. Alternatively, the duct can be mounted at a different height, for example, along the base board of the hallway. The entire perimeter of the hallway can be installed with the duct at this initial stage. In addition, it is preferred to keep an excess amount of duct available beyond the anticipated position of the furthest access box location to accommodate a suitable amount of slack for the service fiber for the furthest living unit. Locations for the base units of the drop fiber point of entry system can be marked. An exemplary tool and system for installing the duct is described in US Patent Publication No. 2009/0324188, incorporated by reference above.

The locations for the base units of the fiber drop point of entry system can be inspected, e.g., by drilling a small hole (e.g., a 1/16 inch to 3/4 inch hole) in the hallway wall and examining the holes and the corresponding interior wall space for obstructions.

Optionally, a first base unit (similar to base unit 120) can be installed at a first drop location, preferably the base unit is installed at a location furthest downstream from the telecommunications cabinet. The base units can be installed one at a time or the entire hallway can be populated with base units during a single installation.

The base unit, particularly the mounting portion (such as mounting portion 125), can be placed and centered onto the drill hole such that its central port (see e.g., port 126) fits into the drill hole. The mounting portion can then be secured to the wall via conventional anchors, screws, or the like. The carrier (such as carrier 170) can be fitted with a conventional coupling (such as coupling 174). The extension arm 175 (in this example, a plastic cable tie) can be fastened to the mounting portion so that it extends into the interior wall space.

Figure 7A:
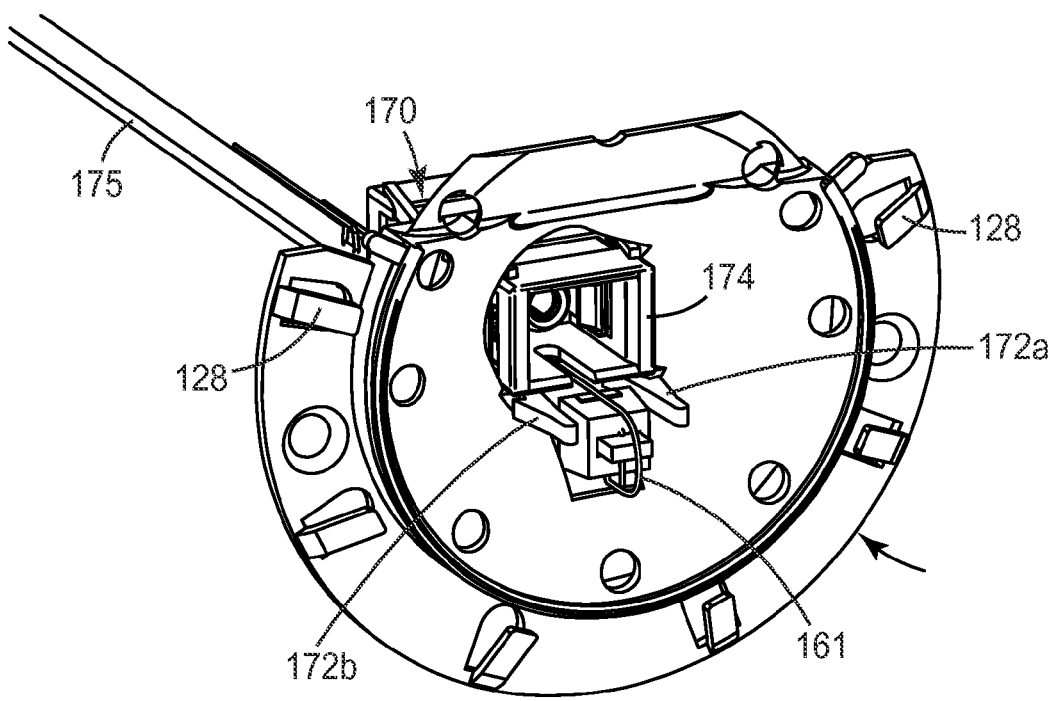
FIG. 7A is an isometric view of a pre-installation assembly according to another aspect of the present invention.

An illustration of an exemplary pre-installation assembly is shown in FIG. 7A. Prior to mounting the base unit mounting portion to the wall at the proper location, the carrier can be mounted to the mounting portion (e.g., by releasably engaging extension legs 172*a* and 172*b* with the rear portion 127 (see FIG. 2B) of the base unit that can extend into the space between the walls). In addition, a string or line 161 can be tied to the carrier to provide for "fishing" the carrier from inside the wall after installation.

The assembly shown in FIG. 7A can then be fully anchored to the hallway wall at the point of entry. The appropriate fiber (not shown) can be retrieved from the duct and then terminated to a suitable connector (such as connector 182 described above). For example, a window cut can be made to an outer surface of the conduit portion of the duct to expose one or more of the fibers to be provided to the customer's location. The desired service fiber for that location can be cut at location downstream from point of entry then pulled back to the mounting location. The desired service fiber or fibers can be removed from the duct via the window cut or, alternatively, the duct slit. The desired fiber can then be spliced or otherwise terminated. In a preferred aspect, the desired fiber is field terminated using a procedure in accordance with that described in U.S. Pat. No. 7,369,738. For example, an SC-format NPC connector (available from 3M Company (St. Paul, Minn.)) can be utilized. Alternatively, the fiber can be terminated by a fused-on connector or pigtail. In this manner, the fiber is terminated with a connector having a standard connector format.

Figure 7B:
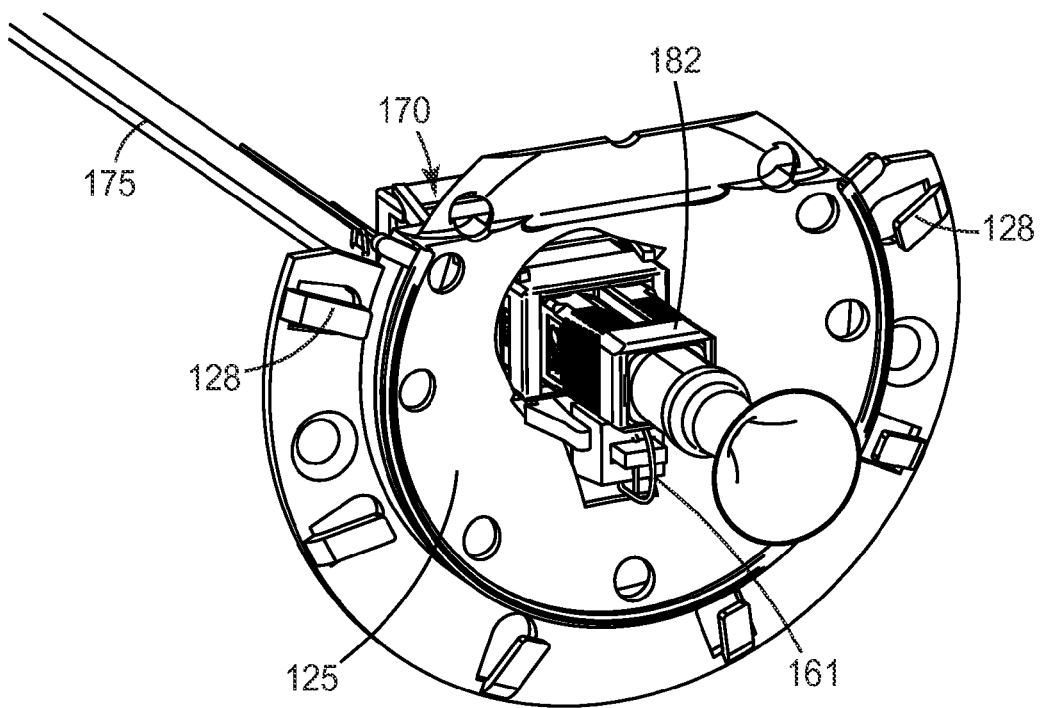
FIG. 7B is an isometric view of a pre-installation assembly with an optical fiber connector mounted therein according to another aspect of the present invention.

The excess fiber (not shown) can be placed around the perimeter of the wall mounting portion and can be retained by a series of tabs (such as tabs 128) disposed along the perimeter of the wall mounting portion. The terminated fiber connector can then be connected to the coupling, such as is shown in FIG. 7B. The carrier can then be released from the port and slid into the interior wall space. The cover can be secured onto the wall mounting portion and the assembly may be left in place for subsequent coupling to a drop fiber when a customer requests service. Thus, the terminated fiber is "parked" in the at the point of entry awaiting a subscriber to call for service.

At the time of a service request, the appropriate line(s) from the telecommunications supplier can be connected to the customer using the point of entry system described herein in the following manner.

The hallway-side base unit (see e.g., unit 120) and assembly can be accessed and removed from the point of entry. A hole can be drilled in the far wall (i.e., the residence or office), preferably in alignment with the hole drilled in the hallway. The hallway-side base unit and assembly can then be re-mounted to the hallway wall, with the second (unattached) end of the extension arm extending through the residence-side hole. Alternatively, a pilot hole can be drilled from the hallway first, with the proper sized hole drilled from the residence side.

From the residence/office wall, the point of entry hole is cleaned and remaining debris is removed. The second base unit mounting portion (such as mounting portion 155), can be placed and centered onto the drill hole to ensure that its main port (see e.g., port 126) fits over/into the drill hole. Fastener locations can be marked prior to removing the residence-side base unit mounting portion 155. The extension arm can be accessed and its second end fastened to the residence-side mounting portion, thus linking the first and second base units together. The string is then accessed to pull the carrier towards the residence-side port. The carrier can be pulled until it is mounted to the mounting portion (e.g., by releasably engaging extension legs 172*c* and 172*d* with the rear portion 127 of the residence-side base unit).

Figure 7C:
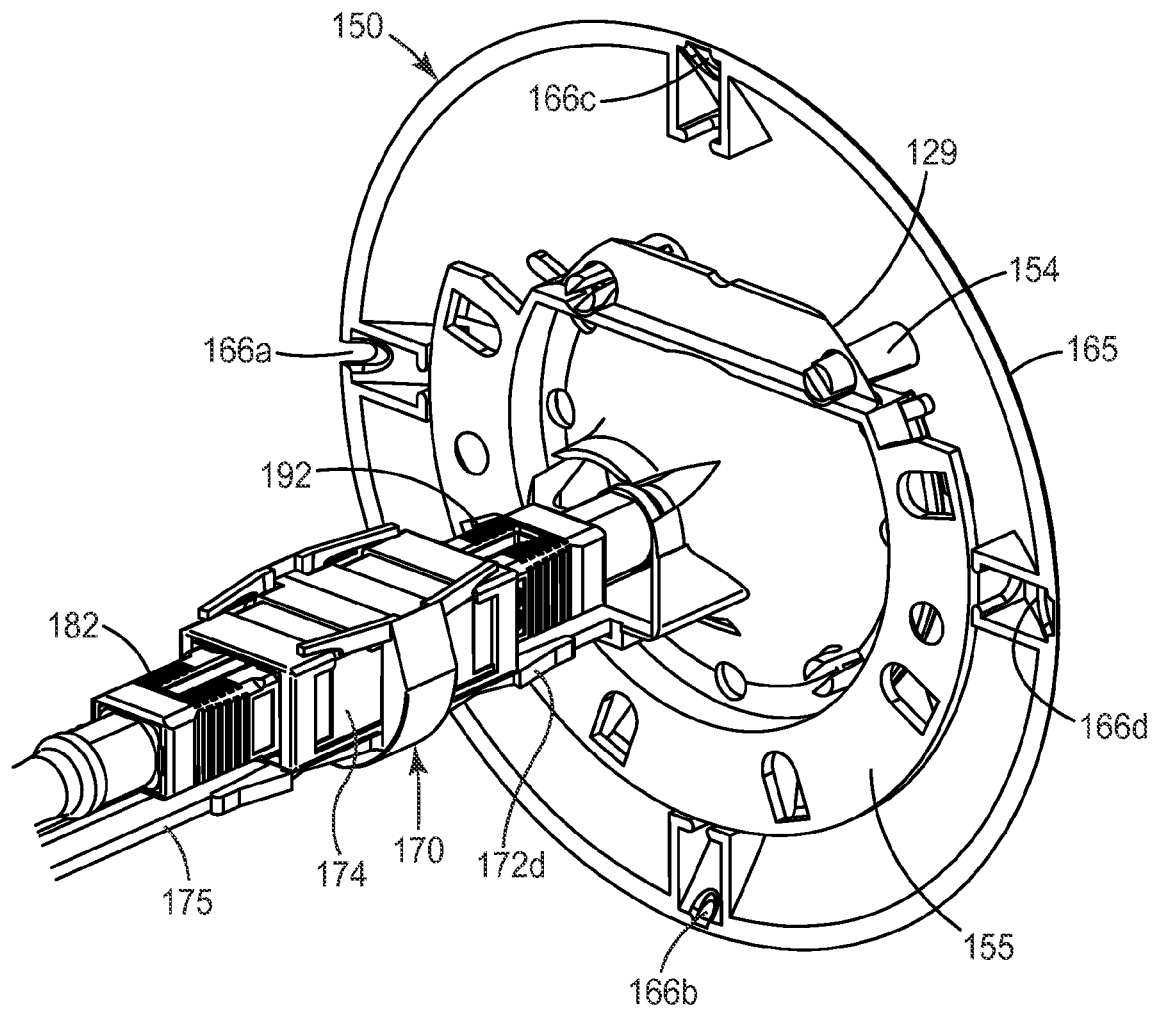
FIG. 7C is an isometric rear view of a residence-side base unit and mounted carrier according to another aspect of the present invention.

The drop fiber can then be spliced or otherwise terminated to a fiber connector (such as connector 192) in a manner similar to that described above. A connection can be made to the terminated service fiber by plugging the connectorized drop cable into the coupling 174 mounted on the carrier 170. An illustration of this assembly is shown in FIG. 7C, where the residence-side cover 165 is mounted to the wall mounting portion 155 via one or more posts 154 engaging mounting holes 129.

In this exemplary aspect, the residence-side cover 165 includes one or more removable notch-shaped ports 166*a*-166*d* (having the same or differing sizes) formed at one or more locations on a perimeter of cover 165. Each of these notch-shaped ports may be removed to receive an appropriately sized drop cable. Prior to the placement of the residence-side cover 165 onto the wall mounting portion 155, the appropriate notch-shaped port 166*a*-166*d* can be selected for receiving the residence-side drop cable (not shown). In addition, excess fiber (not shown) can be placed around the perimeter of the wall mounting portion and loosely secured by a series of tabs or other structures disposed thereon. The cover 165 can be placed onto the wall mounting portion 155 to complete the installation.

In a further alternative aspect, the fiber drop point of entry system can be utilized for a direct fiber feed-through. In this alternative aspect, a first base unit (similar to base unit 120) can be installed at a first drop location on the hallway side of an MDU. A second base unit (similar to base unit 150) is installed on the residence side. An optical fiber communications line is accessed from the duct (via a window cut or through a slit) at the point of entry. Instead of terminating the accessed fiber within the interior wall space, the accessed fiber is fed through the first base unit directly to the second base unit. In this aspect, the accessed fiber can be terminated at the residence side at an ONT or other termination point. In this alternative aspect, the carrier, coupling and extension arm can be omitted.

Thus, the present system and method allows for each drop location along a hallway of an MDU (such as a school, hotel, hospital or MTU) to be prepared with service fiber prior to a service connection or hookup at the first point of entry. In this aspect, each successive service fiber can be identified and cut at a downstream point of entry location and terminated as described above. Each point of entry location can include a "parked" service fiber awaiting hookup upon subscription. Also, the terminated service fiber can be tested to qualify the line and ensure that service is ready for a subscribing customer.

Overall, the low profile point of entry system and method described herein can lower the installation cost of a critical segment of the FTTX network by offering increased speed and ease of deployment. The system components can also be designed to improve building hallway aesthetics important to owners and tenants. Furthermore, the installer can mount the low profile base unit directly on the duct. This approach further controls the sometimes intrusive nature imposed upon the building aesthetics and provides flexibility to the installer in terms of duct and point of entry placement since the termination connectivity of the system will reside in the interior wall space. In an alternative aspect, the residence side base unit may be installed when the service fiber is installed. When a customer requests service, the terminated drop cable can be plugged into the coupling to establish service.

Moreover, conventional wall outlets most often have at least one connector exposed to the exterior of a conventional wall box, making it susceptible to damage. Alternatively, larger conventional wall outlet boxes are frequently used to fully enclose the termination connectivity of both the distribution fiber and drop fiber. However, this conventional approach can be obtrusive and can negatively impact hallway aesthetics.

The low profile point of entry system described herein also provides a network test access point without entering tenant's residence, therefore eliminating or reducing the potential for service disruption to other tenants. The system facilitates a reduced labor cost used to activate service as the connectivity equipment is already pre-positioned at the living unit, thereby avoiding the need to return and run a drop cable from a building FDT to a residence's ONT.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A low profile telecommunications fiber drop point of entry system, comprising:
    a duct having one or more optical fiber communications lines and mountable to a first wall; and
    an access and storage structure at least partially disposable behind the first wall, the structure including a first base unit having a first wall mounting portion and a first low profile cover, the cover being mountable over at least a portion of the duct, the first wall mounting portion including a main port to fit into a hole formed in the first wall, the structure having a fiber slack storage area disposed between the first wall mounting portion and the first cover, the structure further including an extension arm mounted to the first wall mounting portion and extending behind the first wall, the extension arm supporting a carrier configured to hold an optical fiber connector coupling device, wherein a first optical fiber from the duct is terminated in a first optical fiber connector that is received by the connector coupling device.

2. The low profile telecommunications fiber drop point of entry system of claim 1, further comprising:
    a second base unit disposed on a second wall opposite the first wall, the second base unit having a second wall mounting portion and a second low profile cover, the second base unit coupled to the first base unit via the extension arm, wherein the carrier is disposed in an interior wall space formed between the first and second walls.

3. The low profile telecommunications fiber drop point of entry system of claim 2, wherein the coupling device receives a second optical fiber connector that terminates a drop fiber originating at a customer location.

4. The low profile telecommunications fiber drop point of entry system of claim 2, wherein the first and second covers each have a depth of from about 0.10 inches to about 0.5 inches.

5. The low profile telecommunications fiber drop point of entry system of claim 1, wherein at least one of the base units includes a tubular extension disposed in the interior wall space to surround at least a portion of the coupling device.

6. The low profile telecommunications fiber drop point of entry system of claim 1, wherein the duct is formed from a flexible material.

7. The low profile telecommunications fiber drop point of entry system of claim 1, wherein the one or more communications lines comprise one of a plurality of loose optical fibers and a fiber ribbon cable.

8. The low profile telecommunications fiber drop point of entry system of claim 1, wherein the one or more fiber optic communications lines further comprise at least one of a coaxial cable and an electrical wire.

9. The low profile telecommunications fiber drop point of entry system of claim 2, wherein the second wall is disposed in an individual living unit in a multi-dwelling unit (MDU).

10. The low profile telecommunications fiber drop point of entry system of claim 1, wherein the first base unit is mounted in on a hallway wall in one of an MDU, school, hotel, hospital and an MTU.

11. The low profile telecommunications fiber drop point of entry system of claim 1, wherein the duct comprises a low-profile, adhesive-backed ribbon fiber tape.

12. A low profile telecommunications fiber drop point of entry system, comprising:
    a duct having one or more communications lines and mountable to a first wall; and
    an access and storage structure at least partially disposable behind the first wall, the structure including a first base unit having a first wall mounting portion and a first low profile cover, the cover being mountable over at least a portion of the duct, the first wall mounting portion including a main port having a funnel-type shape to fit into a hole formed in the first wall, the structure having a fiber slack storage area disposed between the first wall mounting portion and the first cover, the structure further including at least one of an optical fiber connector coupling device, a mechanical splice and a fusion splice, wherein a first optical fiber from the duct is terminated in a first optical fiber connector that is received by one of the connector coupling device, mechanical splice and fusion splice, and wherein the structure further includes a tubular extension extending from an end of the port and disposed in the interior wall space to surround at least a portion of one of the coupling device, mechanical splice and fusion splice.

13. The low profile telecommunications fiber drop point of entry system of claim 12, further comprising:
    a second base unit disposed on a second wall opposite the first wall, the second base unit having a second wall mounting portion and a second low profile cover.

14. The low profile telecommunications fiber drop point of entry system of claim 13, wherein the coupling device receives a second optical fiber connector that terminates a drop fiber originating at a customer location.

15. The low profile telecommunications fiber drop point of entry system of claim 12, wherein the first and second covers each have a depth of from about 0.10 inches to about 0.5 inches.

16. The low profile telecommunications fiber drop point of entry system of claim 12, wherein the one or more communications lines further comprise at least one of a coaxial cable and an electrical wire.

17. A low profile telecommunications fiber drop point of entry access and storage structure at least partially disposable behind a first wall, comprising:

a first base unit having a first wall mounting portion and a first low profile cover, the cover being mountable over the first wall mounting portion, the first wall mounting portion including a main port having a funnel-type shape to fit into a hole formed in the first wall; and a tubular extension extending from an end of the main port and disposed in an interior wall space formed between the first wall and a second, opposite wall, to surround at least a portion of one of a coupling device, a mechanical splice and a fusion splice.

18. The low profile telecommunications fiber drop point of entry access and storage structure of claim 17, further comprising:

a second base unit disposed on the second wall, the second base unit having a second wall mounting portion, a second low profile cover, and a second tubular extension.

* * * * *